US012287596B2

(12) United States Patent
Souda et al.

(10) Patent No.: US 12,287,596 B2
(45) Date of Patent: Apr. 29, 2025

(54) IMAGE FORMING APPARATUS

(71) Applicant: BROTHER KOGYO KABUSHIKI KAISHA, Nagoya (JP)

(72) Inventors: Makoto Souda, Nagoya (JP); Takuya Nishimura, Nukata-gun (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 165 days.

(21) Appl. No.: 18/045,613

(22) Filed: Oct. 11, 2022

(65) Prior Publication Data

US 2023/0120857 A1 Apr. 20, 2023

(30) Foreign Application Priority Data

Oct. 15, 2021 (JP) ................................. 2021-169877

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS

2007/0183805 A1* 8/2007 Tsukada ............. G03G 15/2039 399/69
2011/0262158 A1* 10/2011 Hitoshi ................ G03G 15/205 399/43
2012/0033987 A1 2/2012 Ikegami et al.
2015/0037055 A1 2/2015 Kitagawa et al.
2016/0116867 A1* 4/2016 Kitagawa ........... G03G 15/2028 399/68
2016/0205279 A1* 7/2016 Yokoyama ......... H04N 1/00708 358/1.12

FOREIGN PATENT DOCUMENTS

JP 2011-33713 A 2/2011
JP 2011 242746 A 12/2011
JP 2013-231803 A 11/2013

* cited by examiner

*Primary Examiner* — Stephanie E Bloss
*Assistant Examiner* — Michael A Harrison
(74) *Attorney, Agent, or Firm* — Merchant & Gould P.C.

(57) ABSTRACT

An image forming apparatus includes a sheet-supplier, a photoconductor, a fuser and a controller. The controller is configured to, in a case where the number of sheets to be printed indicated by a printing job is less than a first predetermined number of sheets, start supplying a sheet by a sheet-supplier at a timing when a second period of time has been passed from a timing when the temperature in the fuser has reached a second temperature, and, in a case where the number of sheets to be printed is equal to or greater than the first predetermined number of sheets, start supplying the sheet by the sheet-supplier at a timing when the second period of time has been passed from a timing when the temperature in the fuser has reached a first temperature larger than the second temperature.

14 Claims, 7 Drawing Sheets

IMAGE FORMING APPARATUS

REFERENCE TO RELATED APPLICATIONS

The present application claims priority from Japanese Patent Application No. 2021-169877, which was filed on Oct. 15, 2021, the disclosure of which is herein incorporated by reference in its entirety.

BACKGROUND ART

The following disclosure relates to an image forming apparatus.

There has been known a conventional image forming apparatus including a controller configured to control a sheet-supplier to supply a recording medium to a nip portion of a fuser based on temperature information outputted from a temperature sensor that detects a temperature of a fixing roller. In the image forming apparatus, a sheet-supply-start temperature that is a temperature of the fixing roller is set as a trigger for starting image forming by operating the sheet-supplier. Moreover, in the image forming apparatus, the sheet-supply-start temperature is set such that the sheet-supply-start temperature in a case where the number of sheets on which images are to be printed becomes is less than a predetermined number of sheets is lower than that of in a case where the number of sheets on which images are to be printed is equal to or greater than the predetermined number of sheets.

DESCRIPTION

The image forming apparatus includes a heater, an endless belt and a pressure roller in the fuser. In a case where the heater having a longitudinal direction in a width direction of the belt heats the belt and the nip portion is formed by which the belt is interposed between the heater and the pressure roller in the fuser, the belt and the heater each having a low heat capacity are used. As a result, a temperature of the nip portion is easily decreased in a case where the number of sheets on which the images are to be formed becomes large. In this case, there is a possibility that it is difficult to ensure sufficient strength of fixing of the images onto the recoding medium.

An aspect of the disclosure relates to an image forming apparatus capable of suppressing a decrease in strength of fixing of toner images onto a sheet.

In one aspect of the disclosure, an image forming apparatus includes a sheet-supplier configured to supply a sheet, a photoconductor configured to form a toner image on the sheet supplied by the sheet-supplier, a fuser configured to fix, by heating, the toner image formed on the sheet by the photoconductor, a controller. The fuser includes a heater including a substrate and a resistance heating element, an endless belt configured to rotate around the heater, a pressure rotator configured to form a nip portion in which the endless belt is interposed between the pressure rotator and the heater, a temperature sensor configured to detect a temperature of the heater. The controller is configured to start supplying electric power to the heater in response to receiving a printing job, in a case where the number of sheets to be printed indicated by the printing job is less than a first predetermined number of sheets, start supplying the sheet by the sheet-supplier at a timing when a second period of time has been passed from a timing when the temperature detected by the temperature sensor has reached a second temperature, and, in a case where the number of sheets to be printed indicated by the printing job is equal to or greater than the first predetermined number of sheets, start supplying the sheet by the sheet-supplier at a timing when the second period of time has been passed from a timing when the temperature detected by the temperature sensor has reached a first temperature that is larger than the second temperature.

In another aspect of the disclosure, an image forming apparatus includes a sheet-supplier configured to supply a sheet, a photoconductor configured to form a toner image on the sheet supplied by the sheet-supplier, a fuser configured to fix, by heating, the toner image formed on the sheet by the photoconductor, and a controller. The fuser includes a heater including a substrate and a resistance heating element, an endless belt configured to rotate around the heater, a pressure rotator configured to form a nip portion in which the endless belt is interposed between the pressure rotator and the heater, a temperature sensor configured to detect a temperature of the heater. The controller is configured to start supplying electric power to the heater in response to receiving a printing job, in a case where the number of sheets to be printed indicated by the printing job is less than a predetermined number of sheets, start supplying the sheet by the sheet-supplier at a timing when a second period of time has been passed from a timing when the temperature detected by the temperature sensor has reached a second temperature, and, in a case where the number of sheets to be printed indicated by the printing job is equal to or greater than the predetermined number of sheets, start supplying the sheet at a timing when a first period of time that is larger than the second period of time has been passed from a timing when the temperature detected by the temperature sensor has reached a first temperature that is larger than the second temperature.

In another aspect of the disclosure, an image forming apparatus includes a sheet-supplier configured to supply a sheet, a photoconductor configured to form a toner image on the sheet supplied by the sheet-supplier, a fuser configured to fix, by heating, the toner image formed onto the sheet by the photoconductor, a controller. The fuser includes a heater including a substrate and a resistance heating element, an endless belt configured to rotate around the heater, a pressure rotator configured to form a nip portion in which the endless belt is interposed between the pressure rotator and the heater, and a temperature sensor configured to detect a temperature of the heater. The controller is configured to start supplying electric power to the heater in response to receipt of a printing job, in a state in which the number of sheets to be printed indicated by the printing job is less than a predetermined number of sheets, set a conveying speed of the sheet in the fuser to a first speed at a timing before the supplying by the sheet-supplier is stated, and, in a state in which the number of sheets to be printed indicated by the printing job is equal to or greater than the predetermined number of sheets, set the conveying speed of the sheet in the fuser to a second speed that is smaller than the first speed at the timing before the supplying by the supplied is started.

The objects, features, advantages, and technical and industrial significance of the present disclosure will be better understood by reading the following detailed description of the embodiments, when considered in connection with the accompanying drawings, in which.

FIRST EMBODIMENT

Overall Configuration of Image Forming Apparatus

Figure 1:
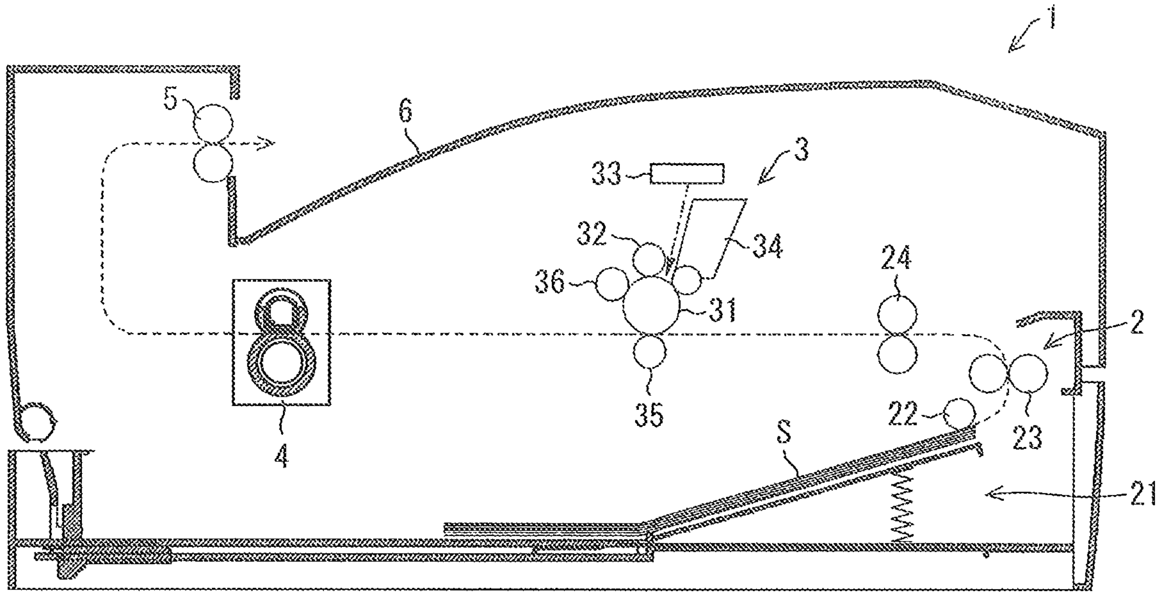
FIG. 1 is a cross sectional view illustrating a configuration of an image forming apparatus of the present disclosure.

There will be described a first embodiment of this disclosure in detail. FIG. 1 is a cross sectional view illustrating a configuration of an image forming apparatus 1 related to the first embodiment of the present disclosure. The image forming apparatus 1 is a monochrome type printer, however, the application of the present disclosure is not limited to a monochrome type printer. The present disclosure can be applied to a color printer. In the present embodiment, there will be a laser printer configured to form an image on a sheet S by using toner as an example of the image forming apparatus 1.

As illustrated in FIG. 1, the image forming apparatus 1 includes a sheet-supplier 2, a process unit 3, a fuser 4, a discharging roller 5 and a discharge tray 6. The sheet-supplier 2 supplies the sheet S, and the sheet-supplier 2 includes a supply tray 21, a pickup roller 22, a conveying roller 23 and a registration roller 24. A recording sheet, an OHP (Over Head Projector) sheet, an envelope, a cardboard and so on are used as the sheet S.

The supply tray 21 is a tray on which the sheet S, which has not been printed yet, is placed. The pickup roller 22 supplies the sheet S from the supply tray 21 one by one. The conveying roller 23 conveys the sheet S supplied by the pickup roller 22 to the registration roller 24. The registration roller 24 conveys the sheet S to the process unit 3 after aligning positions of leading edges of the sheet S.

The process unit 3 forms a toner image on the sheet S supplied by the sheet-supplier 2, and the process unit 3 includes a photoconductor 31, a charging unit 32, an exposing unit 33, a developing unit 34, a transfer unit 35 and a cleaning unit 36.

The photoconductor 31 includes a tube blank made of conductive metal such as aluminum and a photoconductive layer provided on an outer circumferential surface of the tube blank. The photoconductor 31 is a photoconductive dram, which is an OPC (Organic Photo Conductor), including a photoconductive layer having a positive electrostatic property in which the polarity of potential in image forming of the photoconductive layer becomes positive. The photoconductive layer of the photoconductor 31 is charged by the charging unit 32 while being rotated, and the photoconductive layer of the photoconductor 31 is exposed by laser beams from the exposing unit 33. As a result, an electrostatic latent image is formed on a surface of the photoconductor 31. It is noted that the photoconductor 31 may be a metal photoconductive belt having a ring shape and including a photoconductive layer provided on an outer circumferential surface of the belt.

The charging unit 32 charges a surface of the photoconductor 31, and the charging unit 32 is, for example, a charging roller configured to charge the photoconductor 31 by contacting with the photoconductor. Or the charging unit 32 is a scorotron type charging unit configured to charge the photoconductor 31 in a non-contacting manner. The exposing unit 33 exposes the surface of the photoconductor 31 charged by the charging unit 32. For example, the exposing unit 33 includes a plurality of light emitting device arranged in one row along a direction in which a rotation axis of the photoconductor 31 extends. The exposing unit 33 forms an electrostatic latent image on the surface of the photoconductor 31 by emitting light based on printing data.

The developing unit 34 supplies developer to the electrostatic latent image formed on the surface of the photoconductor 31, and the developing unit 34 includes, for example, a developing roller and a developer container in which developer is stored. The transfer unit 35 transfers a developer image formed on the surface of the photoconductor 31 onto the sheet S, and the transfer unit 35 is a transfer roller, for example. The cleaning unit 36 removes developer remaining on the photoconductor 31, paper dust attached to the photoconductor 31 and so on from the photoconductor 31, and the cleaning unit 36 is, for example a cleaning roller.

The fuser 4 heats the toner image formed on the sheet S by the process unit 3 and fixes the toner image onto the sheet S by heating. Details of the fuser 4 will be described below. The discharging roller 5 discharges the sheet S on which the toner image is fixed by the fuser 4 to the discharge tray 6. The discharge tray 6 is a tray on which the sheet S, which has been already printed, is placed.

Figure 2:
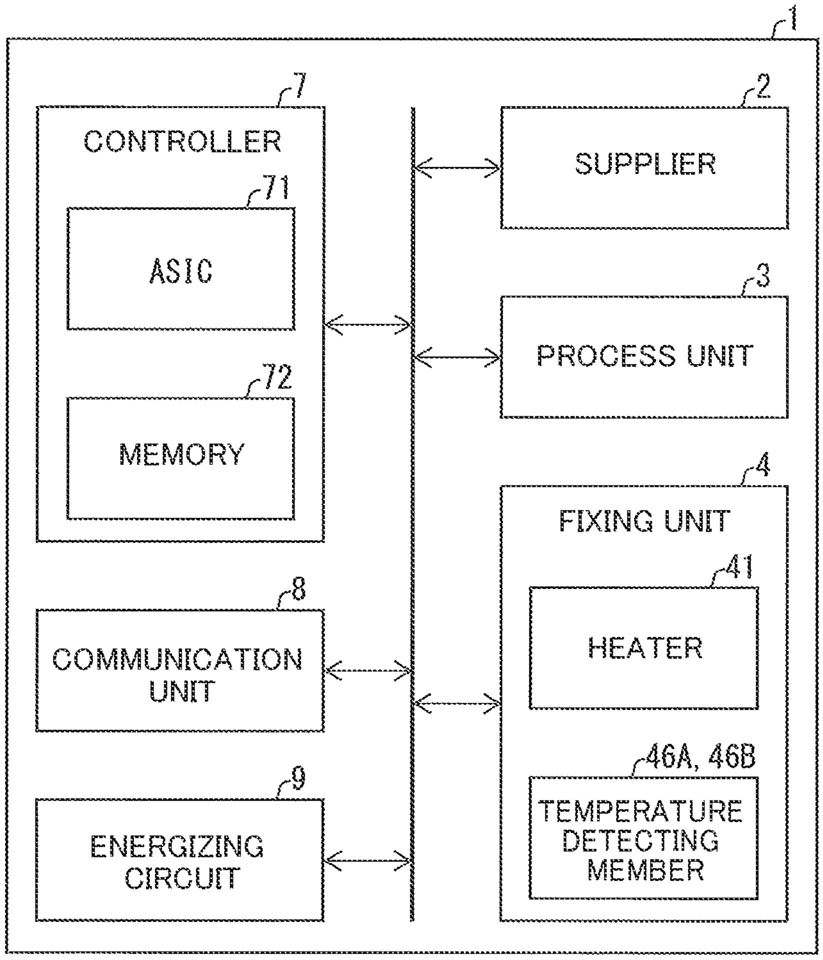
FIG. 2 is a block diagram illustrating a main configuration of the image forming apparatus illustrated in FIG. 1.

FIG. 2 is a block diagram illustrating a main configuration of the image forming apparatus 1 illustrated in FIG. 1. As illustrated in FIG. 2, the image forming apparatus 1 includes a controller 7, a communicating unit 8 and an energizing circuit 9. The controller 7 is a controller configured to control various parts of the image forming apparatus 1, and the controller 7 controls, for example, the sheet-supplier 2, the process unit 3, the fuser 4, the communicating unit 8 and the energizing circuit 9. The controller 7 includes an ASIC 71 (Application Specific Integrated Circuit) and a memory 72. The controller 7 causes the image forming apparatus 1 to execute a printing process and processes associated with the printing process by performing various processes.

It is noted that the controller 7 may include processors such as a CPU (Central Processing Unit). In this case, a control program that accomplishes a printing control method may be stored in the memory 72. And, the printing process in the image forming apparatus 1 may be executed by which the processor of the controller 7 operates based on the control program stored in the memory 72.

Moreover, the controller 7 may include a recording medium storing the control program readable by a computer. A non-transitory and tangible medium, for example, a ROM (Read Only Memory), a magnetic disk, a memory card, a semiconductor memory, a programable logic circuit, and so on can be used as the recording medium.

Moreover, a RAM (Random Access Memory) in which the control program is extracted and so on may be used as the recording medium. The control program may be supplied to the computer via transmission medium such as a communication network, a broadcast wave and so on capable of transmitting the control program. The memory 72 is a memory from which information can be read and to which information can be written. The memory 72 is a RAM or a NVM (Non Volatile Memory). Predetermined information such as the number of sheets to be printed is stored in the memory 72.

The communicating unit 8 includes a communication interface, and the communication unit 8 performs interactive data communication with an external device of the image forming apparatus 1 via a wired or wireless network. The energizing circuit 9 includes a switching element such as a triac. The energizing circuit 9 switches a state between an energizing state in which a current is supplied to a heater 41 of the fuser 4 from an AC supply, which is not illustrated, and a non-energizing state in which the current is not supplied to the heater 41 of the fuser 4 by making the switching element ON or OFF in accordance with an instruction from the controller 7.

Configuration of Fuser

Figure 3:
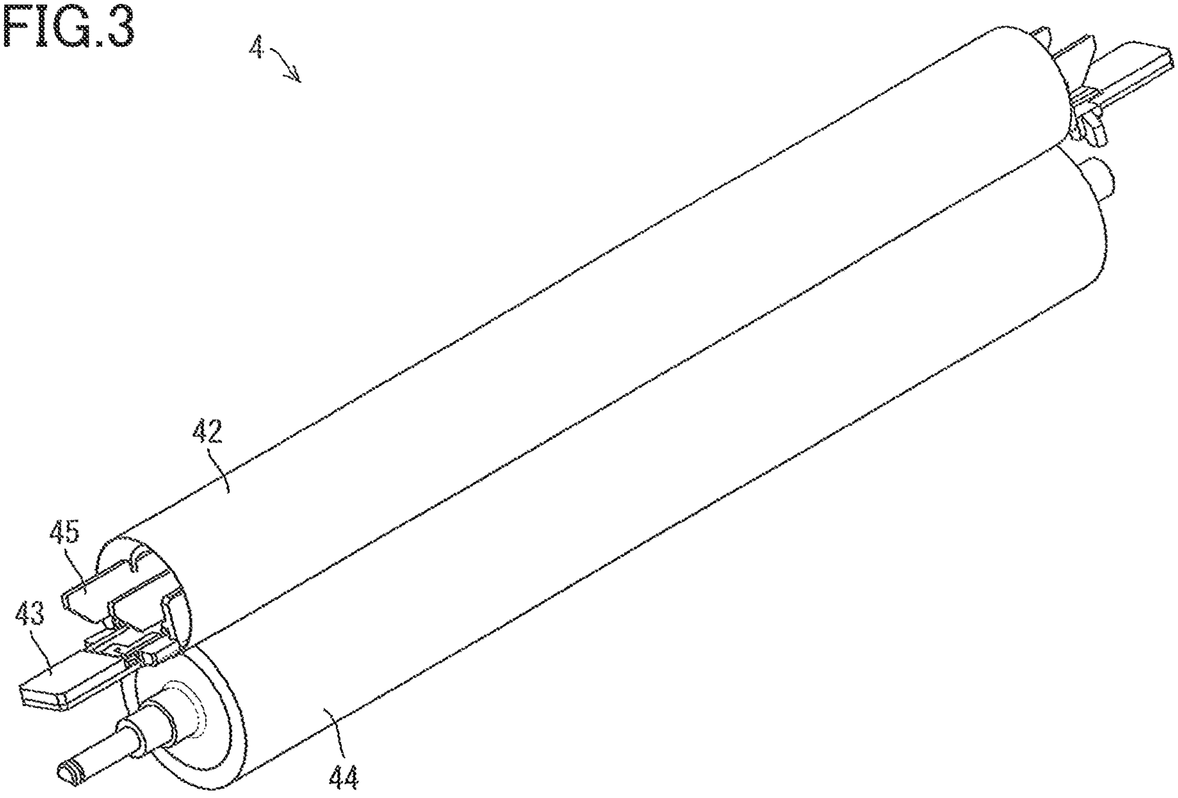
FIG. 3 is a perspective view of a fuser of the image forming apparatus illustrated in FIG. 1.
Figure 4:
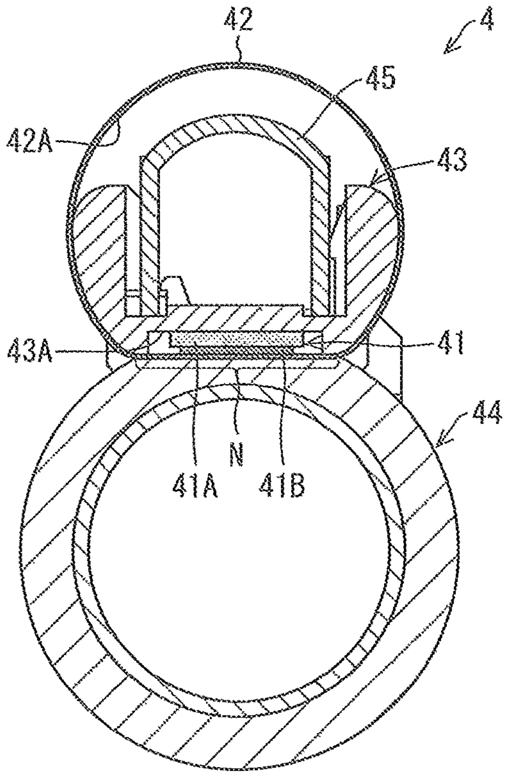
FIG. 4 is a cross sectional view of the fuser illustrated in FIG. 3.
Figure 5:
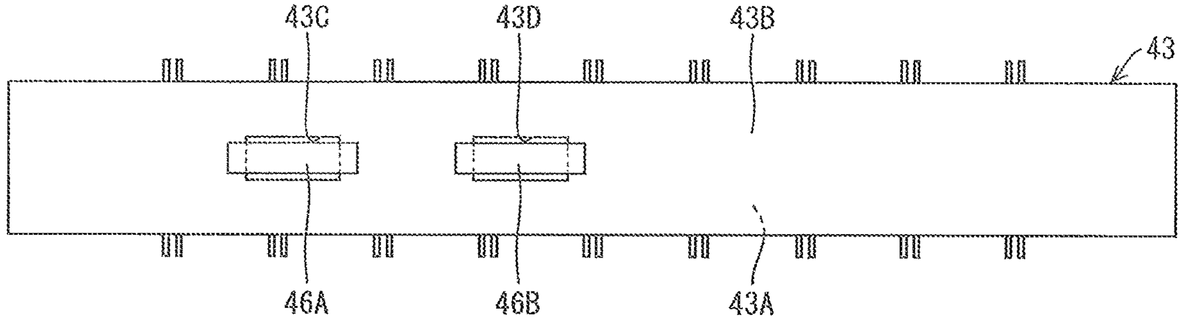
FIG. 5 is a plan view illustrating a holder and a temperature sensor of the fuser illustrated in FIG. 3.

FIG. 3 is a perspective view of the fuser 4 of the image forming apparatus 1 illustrated in FIG. 1, and FIG. 4 is a cross sectional view of the fuser 4 illustrated in FIG. 3. FIG. 5 is a plan view illustrating a holder 43 and temperature sensors 46A, 46B of the fuser 4 illustrated in FIG. 3. As illustrated in FIG. 3 to FIG. 5, the fuser 4 includes the heater 41, a belt 42, the holder 43, a pressure roller 44, a stay 45 and the temperature sensors 46A, 46B.

As illustrated in FIG. 4, the heater 41 is a heat source, and the heater 41 has a plate shape extending in a longitudinal direction of the fuser 4. The heater 41 includes a substrate 41A and a resistance heating element 41B. The substrate 41A has a plate shape extending in the longitudinal direction of the fuser 4. The resistance heating element 41B is disposed on the substrate 41A so as to extend along the longitudinal direction of the fuser 4.

It is noted that the longitudinal direction of the fuser 4 is parallel to the direction in which the rotation axis of the pressure roller 44 extends, and orthogonal to a conveying direction of the sheet S in which the sheet S is conveyed in a nip portion N, which will be described below. In other words, the longitudinal direction of the fuser 4 is a width direction of the sheet S when the sheet S passes through the nip portion N.

Moreover, wirings and terminals and so on which supply electric current to the resistance heating element 41B are provided on the substrate 41A. A substrate made of ceramic is used as the substrate 41A. That is, the heater 41 is a ceramic heater. In this case, the heater 41 is a heater having a low heat capacity. It is noted that the heater 41 may be a metal substrate as the substrate 41A, more specifically, the heater 41 may be a steel heater in which a substrate made of steel is used.

The belt 42 includes the inner circumferential surface 42A which is in contact with the heater 41, and the belt 42 is an endless belt which rotates around the heater 41. Moreover, the belt 42 is a tubular member having a low heat capacity. The belt 42 is constituted by a monolayer or multilayer film having a heat-resistance property, a releasability, a strength, a durability and so on.

The holder 43 is a member supporting the heater 41 and supporting the belt 42 so as to rotate the belt 42, and the holder 43 is made of resin material having a heat-resistance property and an insulating property. The holder 43 includes a supporting surface 43A supporting the heater 41. The supporting surface 43A supports the heater 41 so as to be opposed to a back surface of the heater 41, that is, a surface of the substrate 41A located on a side of the substrate 41A opposite to the resistance heating element 41B in the heater 41. The heater 41 is disposed such that a surface on which the resistance heating element 41B is provided faces an inner circumferential surface 42A of the belt 42.

The pressure roller 44 is an example of a pressure rotator, and the pressure roller 44 cooperates with the heater 41 so as to form the nip portion N at which the belt 42 is interposed between the surface of the heater 41 and the pressure roller 44. Both ends of the pressure roller 44 are respectively supported by a pair of a side frames via bearings. The pressure roller 44 is driven and rotated by a motor of the image forming apparatus 1, and the belt 42 is driven and rotated in accordance with rotation of the pressure roller 44.

The stay 45 is a member for increasing a rigidity of the holder 43, and the stay 45 is disposed on a side opposite to the supporting surface 43A of the holder 43. In a case where the rigidity of the holder 43 is large, the stay 45 can be dispensed with.

It is noted that the pressure rotator is not limited to the pressure roller 44, and the pressure rotator may be constituted by a pressure belt and a nip forming member, for example. That is, an elastic pad and a pressure plate made of resin or metal and so on are disposed, as the nip forming member, in a space surrounded by the pressure belt. The nip forming member is pressed on the surface of the heater 41 via the belt 42 and the pressure belt so as to form the nip portion N.

As illustrated in FIG. 5, the temperature sensors 46A, 46B is provided so as to be opposed to a back surface 43B which is an opposite surface to the supporting surface 43A in the holder 43. Holes 43C, 43D are formed on the back surface 43B of the holder 43. The temperature sensor 46A is in contact with the back surface of the heater 41 through the hole 43C. The temperature sensor 46B is in contact with the back surface of the heater 41 through the hole 43D. Each of the temperature sensors 46A, 46B detects a temperature of the heater 41. Each of the temperature sensors 46A, 46B is a thermistor, however, each of the temperature members 46A, 46B may be another temperature sensor such as a thermostat.

Processes of Controller

Figure 6:
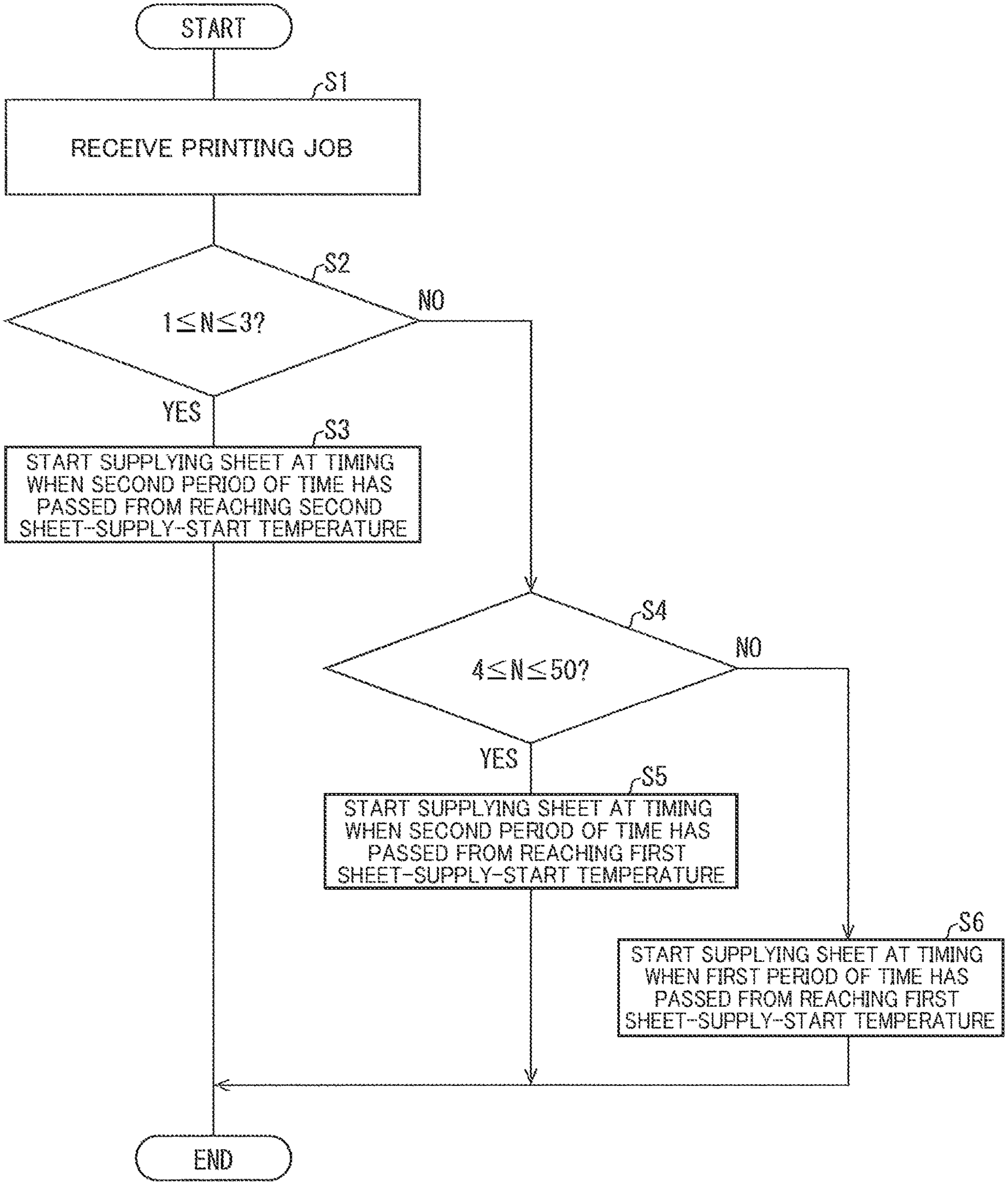
FIG. 6 is a flowchart illustrating an example of a process of a controller illustrated in FIG. 2.

FIG. 6 is a flowchart illustrating an example of a process of the controller 7 illustrated in FIG. 2. As illustrated in FIG. 6, when the controller 7 receives a printing job that instructs printing of the N number of the sheets S at S1, the controller 7 determines whether the N number of the sheets S is equal to or greater than 1 and equal to or less than 3 at S2. The number N is the number of sheets to be printed indicated by the printing job, and the number N is a natural number. When the controller 7 determines that the number N is equal to or greater than 1 and equal to or less than 3 (S2:YES), the controller 7 executes a sheet-supplying process in which the sheet S is supplied based on a second sheet-supply-start temperature.

There will be specifically described the process at S3 below. The controller 7 executes an electric power supplying process in which the controller 7 starts electric power supply to the heater 41 by supplying current to the heater 41 by the energizing circuit 9. As a result of this, the electric power is supplied to the resistance heating element 41B of the heater 41, and the temperature of the heater 41 increases.

After the controller 7 executes the electric power supplying process, the controller 7 starts supply of the sheet S by the sheet-supplier 2 at a timing when a second period of time has passed from a timing when (i) the detected temperature of the temperature sensors 46A has reached the second sheet-supply-start temperature, (ii) the detected temperature of the temperature sensor 46B has reached the second sheet-supply-start temperature, or (iii) both of the detected temperatures of the temperature sensors 46A, 46B have reached the second sheet-supply-start temperature. The controller 7 keeps the electric power supply to the heater 41 during a period of time starting from the timing when the detected temperature of the temperature sensors 46A has reached the second sheet-supply-start temperature, the detected temperature of the temperature sensor 46B has reached the second sheet-supply-start temperature, or both of the detected temperatures of the temperature sensors 46A, 46B have reached the second sheet-supply-start temperature to the timing when the second period of time has passed. Moreover, the controller 7 starts supply of the sheet S by rotating the pickup roller 22, the conveying roller 23 and the registration roller 24 by a motor which is not illustrated.

The second period of time is a shorter period of time than a first period of time which will be described below, and the first period of time and the second period of time indicate a period of time. The second sheet-supply-start temperature is a lower temperature than a first sheet-supply-start temperature which will be described below. It is noted that the second sheet-supply-start temperature may be a lower limit temperature of a temperature range in which the fuser is capable of fixing the toner image onto the sheet S in the fuser 4 when the sheet S has reached the nip portion N. As a result of this, since supplying of the sheet S is started when the temperature in the nip portion N has reached the fixable temperature at which the fuser 4 is capable of fixing the toner image onto the sheet S, it is possible to fix the toner image onto the sheet S without causing poor fixing of toner images.

When the controller 7 determines that the number N is equal to or greater than 4 (S2:NO), the controller 7 determines whether the number N is equal to or greater than 4 and equal to or less than 50 at S4. When the controller 7 determines that the number N is equal to or greater than 4 and equal to or less than 50 (S4:YES), the controller 7 executes the sheet-supplying process at S5 in which the supplying of the sheet S is started based on the first sheet-supply-start temperature. The first sheet-supply-start temperature and the second sheet-supply-start temperature are temperatures included in the temperature range in which the fuser is capable of fixing the toner image onto the sheet S in the fuser 4 when the sheet S has reached the nip portion N.

There will be specifically described the process executed at S5 below. The controller 7 executes the electric power supplying process. After the controller 7 executes the electric power supplying process, the controller 7 starts the supplying of the sheet S by the sheet-supplier 2 at the timing when the second period of time has passed from the timing when the detected temperature of the temperature sensors 46A has reached the first sheet-supply-start temperature, the detected temperature of the temperature sensor 46B has reached the first sheet-supply-start temperature, or both of the detected temperatures of the temperature sensors 46A, 46B have reached the first sheet-supply-start temperature. The controller 7 keeps the electric power supply to the heater 41 during a period of time starting from the timing when the detected temperature of the temperature sensors 46A has reached the first sheet-supply-start temperature, the detected temperature of the temperature sensor 46B has reached the first sheet-supply-start temperature, or both of the detected temperatures of the temperature sensors 46A, 46B have reached the first sheet-supply-start temperature to the timing when the second period of time has passed.

When the controller 7 determines that the number N is equal to or greater than 51 (S4:NO), the controller 7 executes the sheet-supplying process at S6 in which the supplying of the sheet S is started at a timing when the first period of time has passed from the timing when the detected temperature of the temperature sensors 46A has reached the first sheet-supply-start temperature, the detected temperature of the temperature sensor 46B has reached the first sheet-supply-start temperature, or both of the detected temperatures of the temperature sensors 46A, 46B have reached the first sheet-supply-start temperature. The controller 7 keeps the electric power supply to the heater 41 during a period of time starting from the timing when the detected temperature of the temperature sensors 46A has reached the first sheet-supply-start temperature, the detected temperature of the temperature sensor 46B has reached the first sheet-supply-start temperature, or both of the detected temperatures of the temperature sensors 46A, 46B have reached the first sheet-supply-start temperature to the timing when the first period of time has passed.

After executing the processes at S3, S5 and S6, the controller 7 forms the toner image on the sheet S by the process unit 3, and the controller 7 fixes the toner image onto the sheet S by the fuser 4 by heating the toner image formed on the sheet S. Then, the controller 7 discharges the sheet S to the discharge tray 6 by the discharging roller 5. The controller 7 keeps the electric power supply to the heater 41 until the fixing of the toner image onto the sheet S is completed by the fuser 4.

At S3, S5 and S6, the controller 7 executes the sheet-supplying process by the sheet-supplier 2, in which the supplying of the sheet S is started, at the timing when a predetermined period of time has passed from a timing when the detected temperature of the temperature sensors 46A has reached a predetermined temperature, the detected temperature of the temperature sensor 46B has reached the predetermined temperature, or both of the detected temperatures of the temperature sensors 46A, 46B have reached the predetermined temperature.

Moreover, when the number of sheets to be printed indicated by the printing job is less than a predetermined number of sheets, the controller 7 in the sheet-supplying process at S3 and S5 starts the supplying of the sheet S by the sheet-supplier 2 at a timing when the second period of time has passed from the timing when the detected temperature of the temperature sensor 46A has reached a second temperature which is equal to or less than a first temperature, the detected temperature of the temperature sensor 46B has reached the second temperature which is equal to or less than the first temperature, or both of the detected temperatures of the temperature sensors 46A, 46B have reached the second temperature which is equal to or less than the first temperature. In the first embodiment, the first temperature corresponds to the first sheet-supply-start temperature, and the second temperature corresponds to the first sheet-supply-start temperature or the second sheet-supply-start temperature.

Moreover, when the number of sheets to be printed indicated by the printing job is equal to or greater than the predetermined number of sheets, the controller 7 in the sheet-supplying process at S6 starts the supplying of the sheet S by the sheet-supplier 2 at a timing when the first period of time has passed from the timing when the detected temperature of the temperature sensor 46A has reached the first temperature, the detected temperature of the temperature sensor 46B has reached the first temperature, or both of the detected temperatures of the temperature sensors 46A, 46B have reached the first temperature.

According to the above described embodiment, when the number of sheets to be printed is equal to or greater than the predetermined number of sheets, the controller 7 starts the supplying of the sheet S at the timing when the first period of time has passed from the timing when the detected temperature of the temperature sensors 46A has reached the first temperature, the detected temperature of the temperature sensor 46B has reached the first temperature, or both of the detected temperatures of the temperature sensors 46A, 46B have reached the first temperature. The first period of time is longer than the second period of time which is a period of time starting from a timing when the detected temperature of the temperature sensors 46A has reached the first temperature, the detected temperature of the temperature sensor 46B has reached the first temperature, or both of the detected temperatures of the temperature sensors 46A, 46B have reached the first temperature to a timing when the supplying of the sheet S is started in the case where the number of sheets to be printed is less than the predetermined number of sheets.

As a result of this, in the case where the number of sheets to be printed is equal to or greater than the predetermined number of sheets, since the heat is accumulated in the fuser 4, it is possible to suppress a decrease in temperature of the fuser 4 and to suppress a decrease in strength of fixing of the toner image onto the sheet S even when the belt 42 and the heater 41 each having a low heat capacity are used. Since the user estimates a long time to complete the printing process by the image forming apparatus 1 in the case where the number of sheets to be printed is relatively the large number of sheets, as compared with the case where the number of sheets to be printed is the small number of sheets. Accordingly, the user is not bothered with the long time of the printing process and it is possible to ensure the quality of printing.

Moreover, the first sheet-supply-start temperature is a temperature of fixing toner images as a target temperature at which a toner image is heat-fixed on the sheet S by the fuser 4. As a result of this, since the controller 7 starts the supplying of the sheet S at S6 at the timing when the predetermined period of time has passed from the timing when the detected temperature has reached the fixed temperature which is the target temperature at which the toner image can be heat-fixed on the sheet S by the fuser 4, it is possible to more suppress the decrease in strength of fixing of the toner image onto the sheet S in the case where the number of sheets to be printed is equal to or greater than the predetermined number of sheets.

The temperature of fixing toner images is included in the temperature range in which the fuser 4 is capable of fixing the toner image onto the sheet S in a state in which the sheet S has reached the nip portion N in the fuser 4. It is noted that when the temperature detected by each of the temperature sensors 46A, 46B becomes greater than the temperature of fixing toner images, wrinkles of the sheet S and a hot offset of the sheet S occur. This affects the quality of printing. The hot offset of the sheet S indicates situations in which toner on the sheet S fuses too much and in which printing onto the sheet S is not sufficient. Since the first sheet-supply-start temperature is the temperature of fixing toner images, it is possible to suppress the decrease in strength of fixing of toner images onto the sheet S and to prevent an occurrence of such a problem.

SECOND EMBODIMENT

There will be described below a second embodiment of the present disclosure. It is noted that the same reference numerals as used in the first embodiment are used to designate the corresponding elements of the second embodiment, and an explanation of which is dispensed with. Similarly, explanations of a third embodiment and subsequent embodiments are dispensed with.

Figure 7:
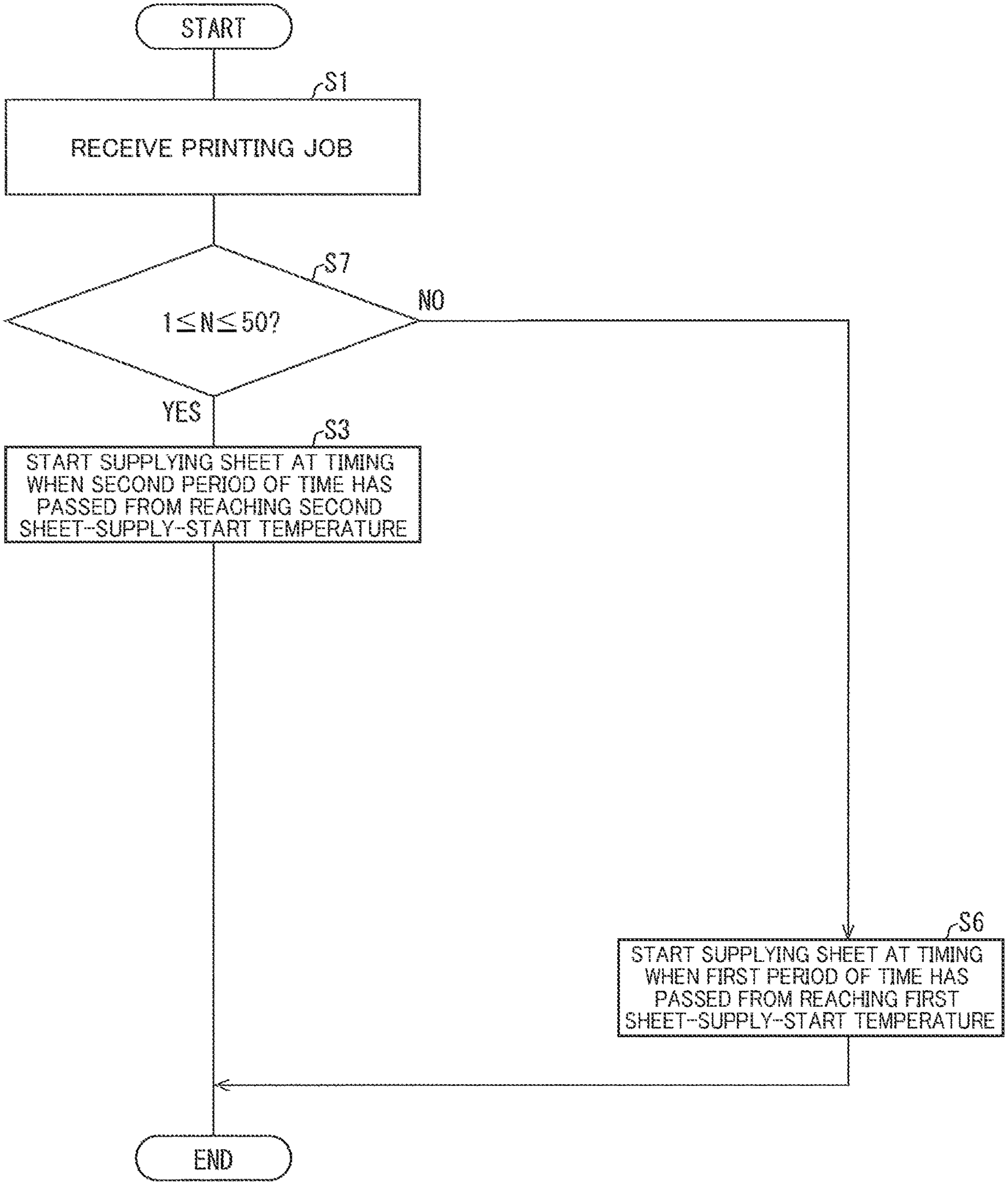
FIG. 7 is a flowchart illustrating an example of another process of the controller illustrated in FIG. 2.

FIG. 7 is a flowchart illustrating an example of a process of the controller 7 illustrated in FIG. 2. In the second embodiment, the controller 7 determines whether the number N is equal to or greater than 1 and equal to or less than 50 at S7 in FIG. 7 in place of S2 illustrated in FIG. 6. When the controller 7 determines that the number N is equal to or greater than 1 and equal to or less than 50 (S7:YES), the controller 7 executes the process of S3. When the controller 7 determines that the number N is greater than 51 (S7:NO), the controller 7 executes the process of S6. The processes of S4 and S5 illustrated in FIG. 6 are not executed. In the second embodiment, the first temperature corresponds to the first sheet-supply-start temperature, and the second temperature corresponds to the second sheet-supply-start temperature. That is, the second temperature is less than the first temperature.

As a result of this, in the case where the number of sheets to be printed is less than the predetermined number of sheets, it is possible to complete the printing before the occurrence of the temperature decrease in the fuser 4 even when the supplying of the sheet S is started in a situation in which the fuser 4 is in a lower temperature, as compared with the case where the number of sheets to be printed is equal to or greater than the predetermined number of sheets. As a result of this, it is possible to reduce FPOT (First Print Out Time) by starting the supplying of the sheet S based on the second temperature which is lower than the first temperature.

Moreover, in the case where the number of sheets to be printed is the small number of sheets, it is common for the user to hope that the printing process by the image forming apparatus 1 finishes earlier, as compared with the case where the number of sheets to be printed is the large number of sheets. As a result of this, it is effective for satisfying the user's needs to start the supplying of the sheet S based on the second temperature lower than the first temperature.

It is noted than the following configurations may be used in the second embodiment in place of the above described configurations. Specifically, the controller 7 executes the sheet-supplying process in which the supplying of the sheet S is started based on a third sheet-supply-start temperature in place of the process of S5 in FIG. 6. The third sheet-supply-start temperature is a temperature greater than the second sheet-supply-start temperature and less than the first sheet-supply-start temperature. In this case, the first temperature corresponds to the first sheet-supply-start temperature, and the second temperature corresponds to the second sheet-supply-start temperature or the third sheet-supply-start temperature.

THIRD EMBODIMENT

Figure 8:
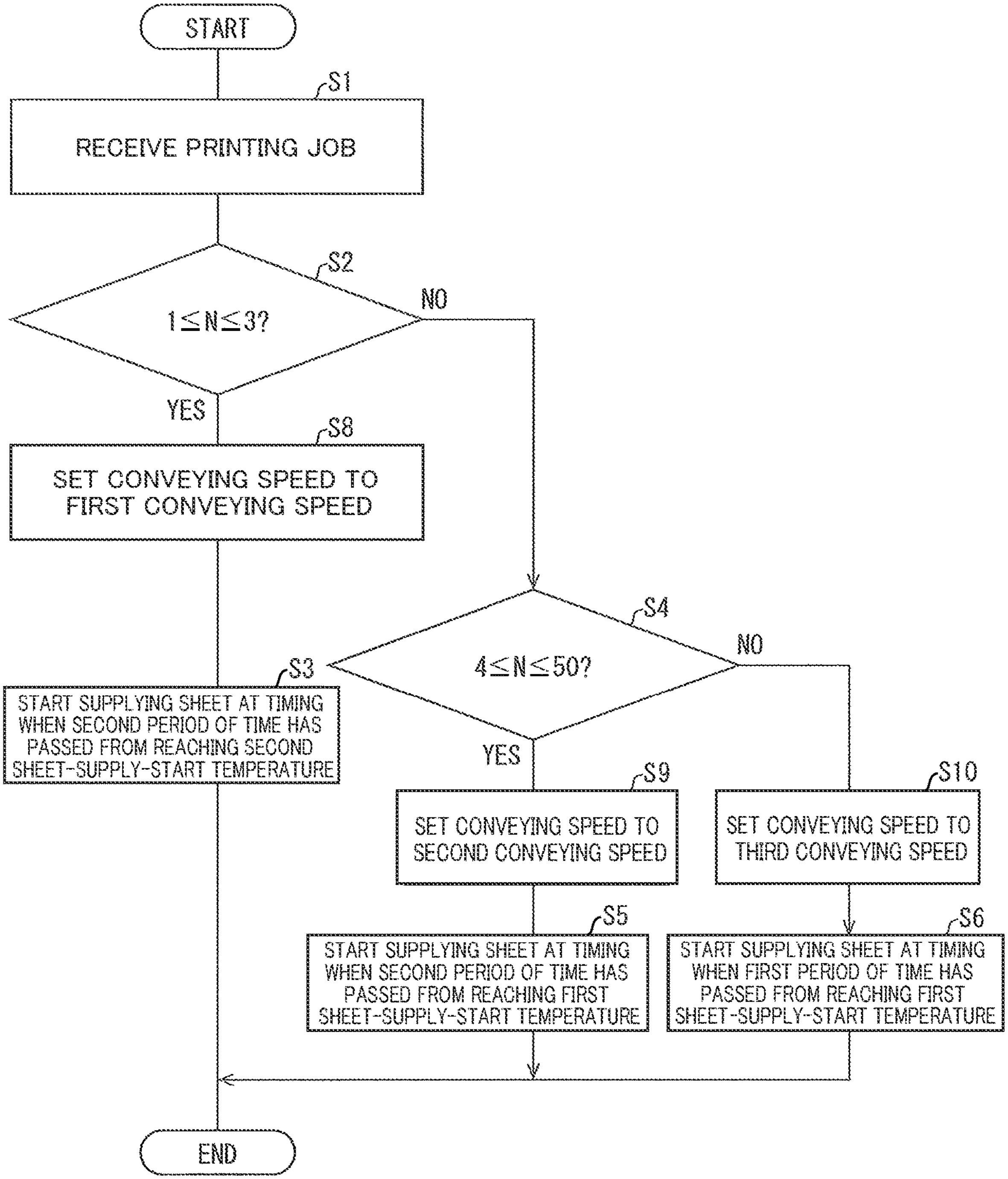
FIG. 8 is a flowchart illustrating an example of another process of the controller illustrated in FIG. 2.

FIG. 8 is a flowchart illustrating an example of a process of the controller 7 illustrated in FIG. 2. In a third embodiment, when the controller 7 determines that the number N is equal to or greater than 1 and equal to or less than 3 (S2:YES in FIG. 8), the controller 7 sets a conveying speed of the sheet S in the fuser 4 to a first conveying speed at S8 before starting the supplying of the sheet S by the sheet-supplier 2. The conveying speed of the sheet S in the fuser 4 is determined by a rotation speed of a motor that rotates and drives the pressure roller 44. Moreover, when the controller 7 determines that the number N is equal to or greater than 4 and equal to or less than 50 (S4:YES), the controller 7 sets the conveying speed of the sheet S in the fuser 4 to a second conveying speed at S9 before starting the supplying of the sheet S by the sheet-supplier 2.

Moreover, when the controller 7 determines that the number N is equal to or greater than 51 (S4:NO), the controller 7 sets the conveying speed of the sheet S in the fuser 4 to a third conveying speed at S10 before starting the supplying of the sheet S by the sheet-supplier 2. The first conveying speed is greater than the second conveying speed, and the second conveying speed is greater than the third conveying speed. The controller 7 sets the conveying speed of the sheet S in the fuser 4 to a greater speed as the number of sheets to be printed indicated by the printing job becomes small.

As described above, the controller 7 executes a speed changing process in which the controller 7 sets the conveying speed of the sheet S in the fuser 4 in the state in which the number of sheets to be printed indicated by the printing job is less than the predetermined number of sheets to a speed greater than the conveying speed in the state in which the number of sheets to be printed indicated by the printing job is equal to or greater than the predetermined number of sheets before starting the supplying of the sheet S by the sheet-supplier 2.

When the conveying speed of the sheet S in the fuser 4 is increased, the number of times of passing the heater by a surface of the pressure roller 44 in a unit time before the sheet S reaches the nip portion N becomes larger. Accordingly, it is possible to effectively heat the surface of the pressure roller 44 quickly and to suppress the occurrence of poor fixing of toner images. Accordingly, in the case where the number of sheets to be printed is less than the predetermined number of sheets, it is possible to suppress the occurrence of poor fixing of toner images even when the supplying of the sheet S is started at a timing when the temperature of the fuser 4 is a lower temperature, as compared with the situation in which the number of sheets to be printed is equal to or greater than the predetermined number of sheets.

FOURTH EMBODIMENT

Figure 9:
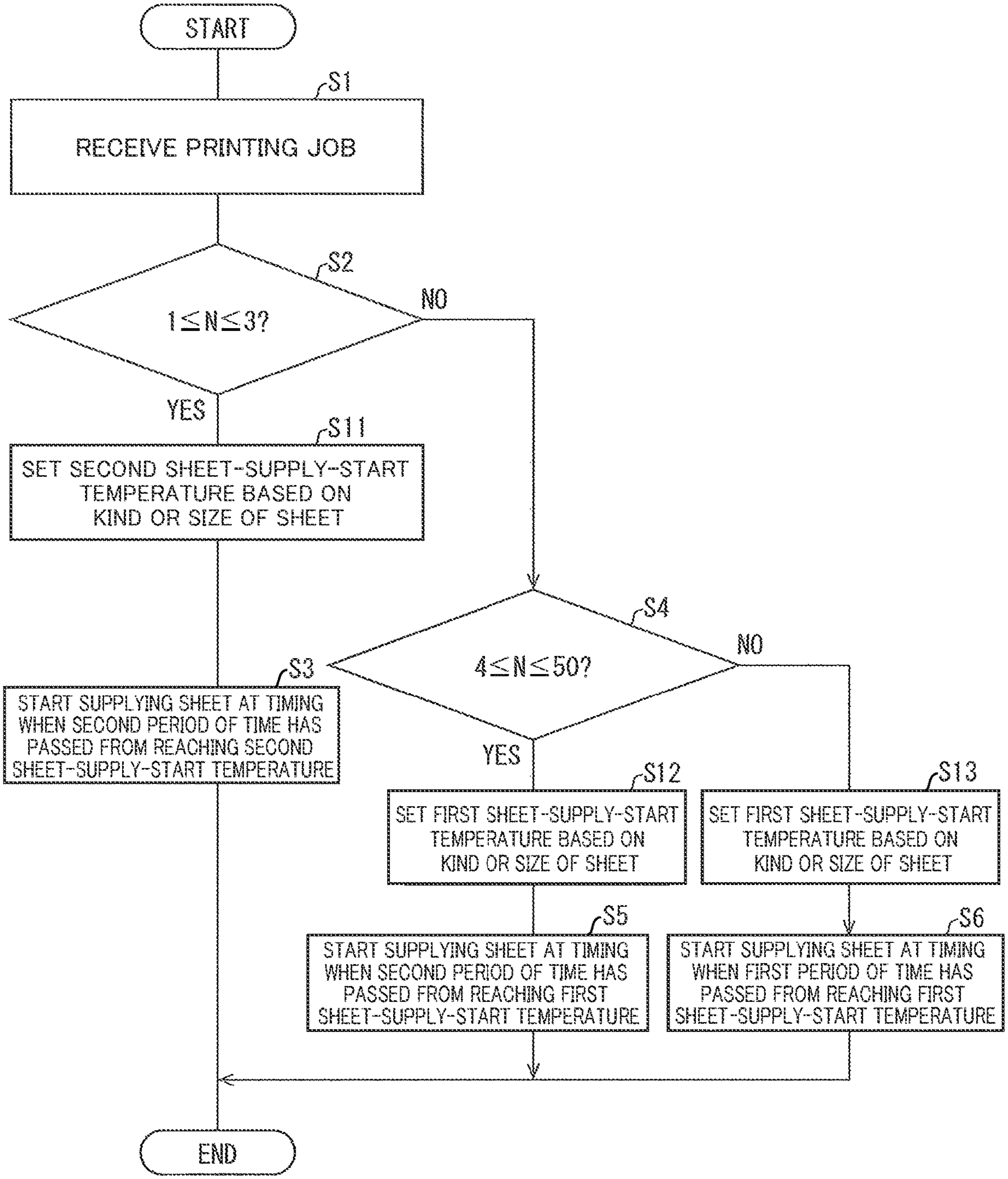
FIG. 9 is a flowchart illustrating an example of another process of the controller illustrated in FIG. 2.

FIG. 9 is a flowchart illustrating an example of a process of the controller 7 illustrated in FIG. 2. In a fourth embodiment, the controller 7 executes a temperature changing process at S12 or S13 illustrated in FIG. 9 in which the controller 7 changes the first sheet-supply-start temperature in accordance with kinds of the sheet S, sizes of the sheet S, or both the kinds of the sheet S and the sizes of the sheet S included in the printing job. The sizes of the sheet S are lengths along the conveying direction of the sheet S. The controller 7 sets the first sheet-supply-start temperature to a greater temperature as the size of the sheet S becomes larger. For example, the controller 7 sets the first sheet-supply-start temperature to a third sheet-supply-start temperature in a case where the size of the sheet S included in the printing job is equal to or less than a first size, and the controller 7 sets the first sheet-supply-start temperature to a fourth sheet-supply-start temperature greater than the third sheet-supply-start temperature in a case where the size of the sheet S is greater than the first size. As a result of this, it is possible to properly suppress the decrease in strength of fixing of the toner image onto the sheet S in accordance with the sizes or the kinds of the sheet S.

Moreover, the controller 7 may execute a temperature changing process at S11 illustrated in FIG. 9 in which the controller 7 changes the second sheet-supply-start temperature in accordance with the kinds of the sheet S, the sizes of the sheet S, or both of the kinds of the sheet S and the sizes of the sheet S included in the printing job. The sizes of the sheet S are the lengths along the conveying direction of the sheet S. The controller 7 sets the second sheet-supply-start temperature to a greater temperature as the size of the sheet S becomes larger. For example, the controller 7 sets the second sheet-supply-start temperature to a fifth sheet-supply-start temperature in a case where the size of the sheet S included in the printing job is equal to or less than a first size, and the controller 7 sets the second sheet-supply-start temperature to a sixth sheet-supply-start temperature greater than the fifth sheet-supply-start temperature in a case where the size of the sheet S is greater than the first size. As a result of this, it is possible to properly suppress the decrease in strength of fixing of the toner image onto the sheet S the sheet S in accordance with the kinds and the sizes of the sheet S.

While the embodiments have been described above, it is to be understood that the disclosure is not limited to the details of the illustrated embodiments, but may be embodied with various changes and modifications, which may occur to those skilled in the art, without departing from the spirit and scope of the disclosure. The embodiments embodied with various changes and modifications are included in the technical scope of the present disclosure.

What is claimed is:

1. An image forming apparatus, comprising:

a sheet-supplier configured to supply a sheet;

a photoconductor configured to form a toner image on the sheet supplied by the sheet-supplier;

a fuser configured to fix, by heating, the toner image formed on the sheet by the photoconductor;

a controller, wherein the fuser comprises;

a heater including a substrate and a resistance heating element;

an endless belt configured to rotate around the heater;

a pressure rotator configured to form a nip portion in which the endless belt is interposed between the pressure rotator and the heater;

a temperature sensor configured to detect a temperature of the heater, and wherein the controller is configured to:

start supplying electric power to the heater in response to receiving a printing job;

in response to a determination that the number of sheets to be printed indicated by the printing job is less than a first predetermined number of sheets, start supplying the sheet by the sheet-supplier at a timing when a second period of time has passed from a timing when the temperature detected by the temperature sensor has reached a second temperature;

in response to a determination that the number of sheets to be printed indicated by the printing job is equal to or greater than the first predetermined number of sheets, start supplying the sheet by the sheet-supplier at a timing when the second period of time has passed from a timing when the temperature detected by the temperature sensor has reached a first temperature that is larger than the second temperature;

in response to a determination that the number of sheets to be printed indicated by the printing job is equal to or greater than the first predetermined number of sheets and less than a second predetermined number of sheets that is greater than the first predetermined number of sheets, start supplying the sheet by the sheet-supplier at a timing when the second period of time has passed from the timing when the temperature detected by the temperature sensor has reached the first temperature; and in response to a determination that the number of sheets to be printed indicated by the printing job is equal to or greater than the second predetermined number of sheets, start supplying the sheet at a timing when a first period of time that is larger than the second period of time has passed from the timing when the temperature detected by the temperature sensor has reached the first temperature.

2. The image forming apparatus according to claim 1, wherein the second temperature is less than the first temperature.

3. The image forming apparatus according to claim 1, wherein the first temperature is a target temperature at which the toner image is heat-fixed onto the sheet by the fuser.

4. The image forming apparatus according to claim 1, wherein the second temperature is a lower limit temperature of a temperature range in which the fuser is capable of fixing the toner image onto the sheet when the sheet reaches the nip portion.

5. The image forming apparatus according to claim 1, wherein the controller is configured to:

in the state in which the number of sheets to be printed indicated by the printing job is less than the first predetermined number of sheets, set a conveying speed of the sheet in the fuser to a first speed at a timing before the supplying by the sheet-supplier is started; and in the state in which the number of sheets to be printed indicated by the printing job is equal to or greater than the first predetermined number of sheets, set the conveying speed of the sheet in the fuser to a second speed that is smaller than the first speed at the timing before the supplying by the supplied is started.

6. The image forming apparatus according to claim 1, wherein the controller is configured to change the first temperature based on kinds of sheet indicated by the printing job, sizes of the sheet indicated by the printing job, or both the kinds of sheet and the sizes of the sheet indicated by the printing job.

7. The image forming apparatus according to claim 1, wherein the controller is configured to change the first temperature based on kinds of sheet indicated by the printing job, sizes of the sheet indicated by the printing job, or both the kinds of sheet and the sizes of the sheet indicated by the printing job.

8. The image forming apparatus according to claim 1, wherein the sheet-supplier comprises:

a sheet tray;

a pickup roller configured to supply the sheet from the sheet tray one by one;

a conveying roller configured to convey the sheet supplied by the pickup roller; and a registration roller configured to convey the sheet to the photoconductor after aligning positions of leading edges of the sheet conveyed by the conveying roller.

9. An image forming apparatus, comprising:

a sheet-supplier configured to supply a sheet;

a photoconductor configured to form a toner image on the sheet supplied by the sheet-supplier;

a fuser configured to fix, by heating, the toner image formed on the sheet by the photoconductor;

a controller, wherein the fuser comprises;

a heater including a substrate and a resistance heating element;

an endless belt configured to rotate around the heater;

a pressure rotator configured to form a nip portion in which the endless belt is interposed between the pressure rotator and the heater;

a temperature sensor configured to detect a temperature of the heater, and wherein the controller is configured to:

start supplying electric power to the heater in response to receiving a printing job;

in response to a determination that the number of sheets to be printed indicated by the printing job is less than a predetermined number of sheets, start supplying the sheet by the sheet-supplier at a timing when a second period of time has passed from a timing when the temperature detected by the temperature sensor has reached a second temperature; and in response to a determination that the number of sheets to be printed indicated by the printing job is equal to or greater than the predetermined number of sheets, start supplying the sheet at a timing when a first period of time that is larger than the second period of time has passed from a timing when the temperature detected by the temperature sensor has reached a first temperature that is larger than the second temperature.

10. The image forming apparatus according to claim 9, wherein the second temperature is less than the first temperature.

11. The image forming apparatus according to claim 9, wherein the first temperature is a target temperature at which the toner image is heat-fixed onto the sheet by the fuser.

12. The image forming apparatus according to claim 9, wherein the second temperature is a lower limit temperature of a temperature range in which the fuser is capable of fixing the toner image onto the sheet when the sheet reaches the nip portion.

13. The image forming apparatus according to claim 9, wherein the controller is configured to:

in the state in which the number of sheets to be printed indicated by the printing job is less than the predetermined number of sheets, set a conveying speed of the sheet in the fuser to a first speed at a timing before the supplying by the sheet-supplier is stated; and in the state in which the number of sheets to be printed indicated by the printing job is equal to or greater than the predetermined number of sheets, set the conveying speed of the sheet in the fuser to a second speed that is smaller than the first speed at the timing before the supplying by the supplied is started.

14. An image forming apparatus, comprising:

a sheet-supplier configured to supply a sheet;

a photoconductor configured to form a toner image on the sheet supplied by the sheet-supplier;

a fuser configured to fix, by heating, the toner image formed onto the sheet by the photoconductor;

a controller, wherein the fuser comprises;

a heater including a substrate and a resistance heating element;

an endless belt configured to rotate around the heater;

a pressure rotator configured to form a nip portion in which the endless belt is interposed between the pressure rotator and the heater;

a temperature sensor configured to detect a temperature of the heater, and wherein the controller is configured to:

start supplying electric power to the heater in response to receipt of a printing job;

in a state in which the number of sheets to be printed indicated by the printing job is less than a predetermined number of sheets, set a conveying speed of the sheet in the fuser to a first speed at a timing before the supplying by the sheet-supplier is stated;

in a state in which the number of sheets to be printed indicated by the printing job is equal to or greater than the predetermined number of sheets, set the conveying speed of the sheet in the fuser to a second speed that is smaller than the first speed at the timing before the supplying by the supplied is started;

in response to a determination that the number of sheets to be printed indicated by the printing job is less than the predetermined number of sheets, start supplying the sheet by the sheet-supplier at a timing when a second period of time has passed from a timing when the temperature detected the temperature sensor has reached a second temperature;

in response to a determination that the number of sheets to be printed indicated by the printing job is equal to or greater than the predetermined number of sheets, start supplying the sheet at a timing when the second period of time has passed from a timing when the temperature detected by the temperature sensor has reached a first temperature that is larger than the second temperature;

in response to a determination that the number of sheets to be printed indicated by the printing job is less than the predetermined number of sheets, start supplying the sheet by the sheet-supplier at a timing when a second period of time has passed from a timing when the temperature detected by the temperature sensor has reached a second temperature; and in response to a determination that the number of sheets to be printed indicated by the printing job is equal to or greater than the predetermined number of sheets, start supplying the sheet at a timing when a first period of time that is larger than the second period of time has passed from a timing when the temperature detected by the temperature sensor has reached a first temperature that is larger than the second temperature.

* * * * *